United States Patent [19]
Noakes et al.

[11] 3,898,460

[45] Aug. 5, 1975

[54] PROCESS AND APPARATUS FOR CONVERTING LIQUID BETA RADIATION SCINTILLATION COUNTER TO GAMMA RADIATION COUNTER

[75] Inventors: John E. Noakes, Athens, Ga.; Julious M. Menefee, Novelty, Ohio

[73] Assignee: Bicron Corporation, Newbury, Ohio

[22] Filed: Feb. 1, 1974

[21] Appl. No.: 438,579

[52] U.S. Cl. ................................. 250/328; 250/361
[51] Int. Cl. .............................................. G01t 7/08
[58] Field of Search ........... 250/303, 304, 328, 361, 250/362, 363, 364, 366, 369; 215/10, 12 R

[56] References Cited
UNITED STATES PATENTS

| | | |
|---|---|---|
| 2,855,520 | 10/1958 | Stoddart et al. ................... 250/361 |
| 3,404,270 | 10/1968 | Ross .................................... 250/364 |
| 3,591,807 | 7/1971 | Mays et al. ......................... 250/366 |

*Primary Examiner*—Archie R. Borchelt
*Attorney, Agent, or Firm*—Bosworth, Sessions & McCoy

[57] ABSTRACT

A process and apparatus are disclosed for converting a conventional beta radiation liquid scintillation counter to detect gamma radiation. Special mini-size counting vials are employed of the same size as those used in the detection of beta radiation but such vials detect gamma radiation, which is measured by the beta radiation liquid scintillation counter. These mini-size counting vials have relatively thin walls formed from scintillation crystal chips of an alkali metal halide and are preferably covered by and embedded in a polynuclear aromatic compound.

28 Claims, 9 Drawing Figures

PATENTED AUG 5 1975 3,898,460

SHEET 1

PROCESS AND APPARATUS FOR CONVERTING LIQUID BETA RADIATION SCINTILLATION COUNTER TO GAMMA RADIATION COUNTER

Prior to the present invention, no scintillation counter was available which was effective and commercially practical for measuring both beta and gamma radiation. Liquid scintillation counters have been in use for two decades to detect beta radiation, and gamma counters have been in use for at least as long. The known beta-ray counters were generally unsatisfactory for gamma radiation and vice versa.

Beta radiation is commonly measured with a liquid scintillation counter, such as a conventional beta-ray spectrometer, having a small chamber which receives a small glass vial between opposing photomultiplier tubes. The vial contains, for example, 10 to 20 cubic centimeters of a scintillation solution comprising a primary and/or secondary fluor dissolved in a suitable solvent, such as toluene or xylene. Hundreds of such liquid scintillation vials containing samples to be assayed are automatically fed one at a time to the photomultiplier tubes and the results are recorded by suitable instruments, often with an output of punched tapes in conjunction with a teletypewriter.

Gamma radiation is commonly measured on a solid scintillation counter or spectrometer having a solid crystal fluor, such as a sodium iodide crystal, with a thickness of 1 inch to 3 inches or more which is optically coupled to a photomultiplier. Such crystal has a small cavity therein of a size to receive small glass vials containing samples to be assayed, and large numbers of such vials may be fed one at a time to the cavity. Again there may be punched tapes and a teletypewriter or other means to record or analyze the results. The solid sodium iodide crystal may have a small vial-receiving cavity or well with a diameter of 2 centimeters or so for receiving the vial sample to be assayed. However, the portion of the well counter surrounding the cavity is usually relatively thick (for example, a radial thickness more than 1 centimeter) so that the assembly, even if uncoupled from the photomultiplier, is much too large to permit use in a liquid scintillation spectrometer.

The present invention involves use of special small inorganic crystal-type vials which are constructed as vials to receive the sample and to fit a standard liquid scintillation spectrometer. These special vials preferably are of a size to replace the standard 20-milliliter glass vials commonly used in conventional liquid scintillation counters.

This invention permits conversion of a beta scintillation counter into a gamma counter by the use of special vials and eliminates the need for providing expensive equipment for measuring gamma radiation in addition to the liquid scintillation equipment needed to measure soft beta radiation. The special vials can be made at relatively low cost by use of small pieces of the alkali metal halide or other inorganic crystals which are embedded in a matrix of a cyclic organic scintillator, such as a benzene-type vinyl plastic or preferably a polynuclear aromatic compound.

An object of the invention is to provide an effective, inexpensive, mass production system for measuring gamma radiation on existing conventional liquid scintillation beta-ray spectrometers.

Another object of the invention is to provide a dual-purpose scintillation counting system for both beta and gamma rays which can be provided at minimum cost.

These and other objects, uses and advantages of the invention will become apparent to those skilled in the art from the following drawings, description and claims.

Figure 1:
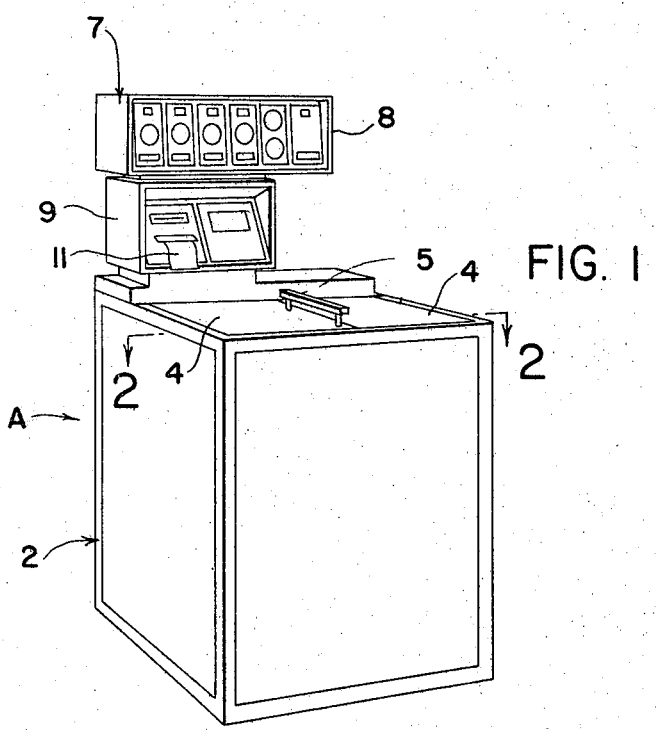
FIG. 1 is a perspective view on a reduced scale showing a conventional liquid scintillation spectrometer which may be used in the practice of this invention.
Figure 2:
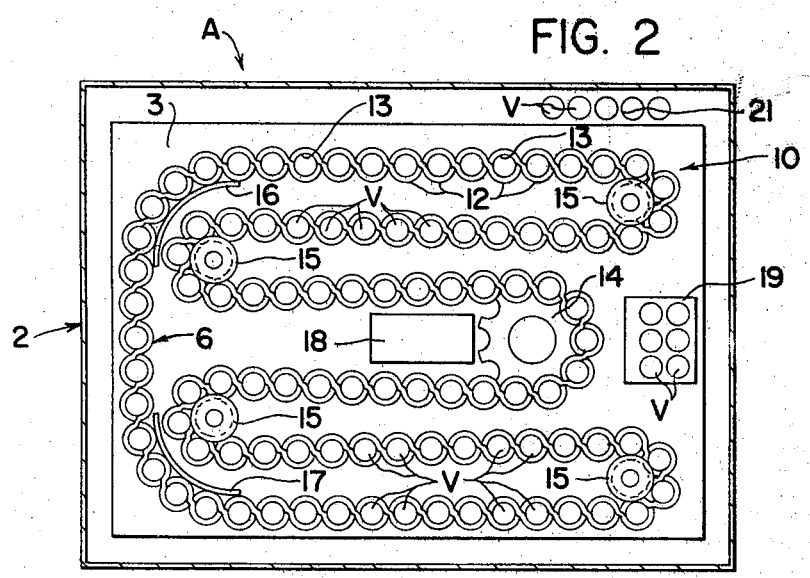
FIG. 2 is a top plan view of the sample changer compartment taken on the line 2—2 of FIG. 1.

Referring more particularly to the drawings, in which like parts are identified by the same numerals throughout the several views, FIGS. 1 and 2 illustrate one form of liquid scintillation serial-counting soft-beta spectrometer (A) made by Beckman Instruments, Inc. of Fullerton, Cal., and identified as LS-100C. Many different types of liquid scintillation counters are in commercial use including those made by Nuclear-Chicago Corporation, Packard Instrument Company, ANS, Inc., Beckman Instruments, Inc., and others, and no claim is made with respect to the superiority of any particular type.

The spectrometer A has a rectangular housing 2 with a large rectangular sample changer compartment 3 at the top closed by a pair of swinging doors 4 having a handle 5. The compartment 3 contains a serpentine link-chain conveyor 6 which carries 100 sample vials $v$. (FIG. 2). A control panel 7 is mounted at the top rear portion of the housing 2 having a wide rectangular upper portion 8 and a rectangular lower portion 9. The upper portion 8 has the usual channel controls and general controls and the lower portion 9 has a counting ratemeter and a lister printer to provide a permanent record of sample number, channel, time, percent error, and counts per minute (cpm). Such information is recorded on the punched tape 11 for each sample and may be used with a teletypewriter or computer in carrying out the assaying operation.

The simpler model LS-100C is shown herein because it readily illustrates the present invention, but it will be understood that the process of this invention applies also to many different liquid scintillation counters having automatic sample changers which handle a number of sample counting vials at one time. Such sample changers generally have storage means or holding means for receiving a very large number of small glass sample vials arranged in long rows or strung out like a chain and also have means for feeding the vials one at a time to a vial-receiving chamber or receptacle adjacent one or more photomultiplier tubes, whereby each vial may be moved in and out of such chamber or receptacle at a predetermined time and the pertinent data recorded on the machine for that sample.

In FIG. 2 the sample changer 10 is located in the upper rectangular compartment 3 of the spectrometer A at the top of the cabinet. The compartment 3 may have a depth of 4 to 6 inches or so and is large enough to receive a metal link-chain conveyor 6 containing 100 sample vials v. The doors 4 swing open to permit unobstructed handling of the vials.

The conveyor 6 has interconnected links with 100 circular sections 12, each having a circular opening 13 of a size to receive one vial v. The links of the conveyor function like a bicycle chain and allow the conveyor to ride on the main drive sprocket 14 and the three idler-wheels 15 while supporting the vials v in vertical upright positions. A pair of curved stationary guide members 16 and 17 are rigidly mounted in fixed positions in the compartment 3 for engaging and guiding the conveyor 6 through a serpentine path as shown in FIG. 2. The sprocket 14 is located between the box 18 and the tray 19 and is driven intermittently by an electric motor (not shown) which is automatically controlled to provide the desired sequence of operations.

Circular recesses or openings 21 are preferably provided at the margin of the compartment 3 to receive a row of extra vials v, and similar circular vial-receiving recesses or openings are provided in the tray 19.

In the housing 2 of the spectrometer A, a pair of opposed photomultiplier tubes (22) are located at opposite sides of a small vial-receiving chamber to which the counting vials are fed one at a time. This chamber together with the photomultiplier tubes and the preamplifiers are housed in a cabinet, which may be refrigerated, if desired. Usually refrigeration is not needed. The two photomultiplier tubes are used in conjunction with a coincidence circuit as is well known in the art. In some models this circuit can be turned off. The circuit is required or advisable when measuring beta radiation but need not be employed when measuring gamma radiation. Various types of circuits are used by different instrument manufacturers and can be used in the practice of the present invention.

Figure 4:
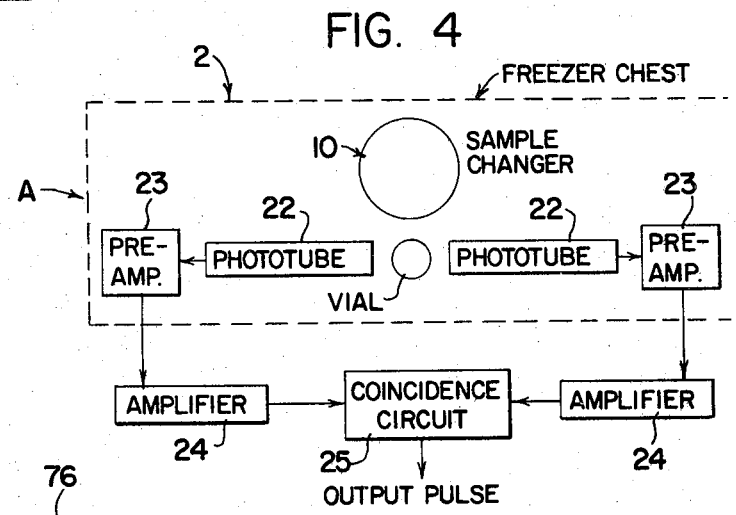
FIG. 4 is a diagrammatic view of a simplified coincidence circuit as used in many liquid scintillation counting systems.

FIG. 4 illustrates schematically the basic elements of a simplified coincidence circuit which applies to most liquid scintillation counters. This circuit is well known and is described in more detail on pages 299 and 300 of "Principles of Radioisotope Methodology" (Third Edition) by Grafton D. Chase and Joseph L. Rabinowitz, Copyright 1967. As indicated in the block diagram, the sample vial containing the sample and the liquid scintillation solution is placed in the cabinet between the two photomultiplier tubes 22. This may be done manually or by an automatic sample changer 10. Each flash of light produced in the liquid scintillator is detected simultaneously by both phototubes 22. The pulses produced by each tube are amplified in a suitable manner, as by an associated preamplifier 23 and amplifier 24, and are fed into the coincidence circuit 25, from which output pulses are delivered to a scaler.

Figure 3:
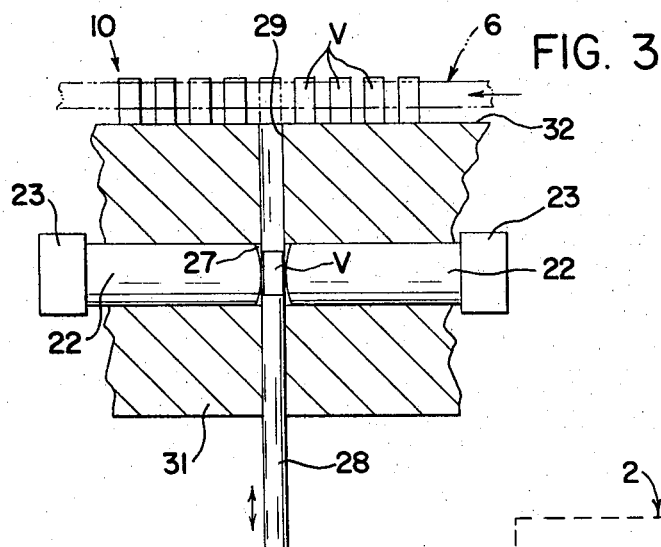
FIG. 3 is a diagrammatic view showing equipment for moving sample vials between the opposed photomultiplier tubes of a liquid scintillation spectrometer.

FIG. 3 illustrates schematically how sample vials v can be fed automatically by a feeding means or conveyor, such as sample changer 10, to and from the small vial-receiving chamber 27 located between the photomultuplier tubes 22 of the spectrometer. As shown, for purposes of diagrammatic illustration, an elevator 28 in the form of a vertical cylindrical rod is mounted to slide in a vertical cylindrical bore 29 of body 31 between an upper discharge position, wherein the flat upper end of the elevator is flush with the flat horizontal upper surface 32 of said body, and a lower position shown in solid lines in FIG. 3, wherein the elevator supports a vial v between the two phototubes 22 and at the axes thereof.

A long row or chain of closely spaced counting vials v is supported on surface 32, and the vials are moved by a suitable conveyor, such as link-chain conveyor 6, while the elevator 28 is in said upper position, to locate one of the vials in a position directly over the elevator and coaxial therewith as indicated in broken line in FIG. 3. The elevator is then retracted to lower that one vial out of the conveyor 6 to the chamber 27 between the phototubes and is thereafter advanced to raise the bottom of the vial back to the level of surface 32. Where the conveyor 6 is employed, this raises the vial v through the circular opening of the link chain at 12. A conventional automatic electric control system may be provided including electric motors to advance the conveyor and to operate the elevator 28 in timed relation so that each vial is fed to the chamber 27 at the desired time.

FIGS. 1 to 4 are intended to illustrate conventional equipment used in a conventional liquid scintillation counting system. In such equipment the sample vials are usually made of a special glass having a low potassium content but can also be made of quartz, Vycor, or other glass or polyethylene or other clear plastic. Such vials are relatively small and they usually have a diameter no greater than about 2 or 3 centimeters and a height no greater than about 6 or 7 centimeters. They have a capacity of at least 10 and usually at least 20 cubic centimeters. The commercial liquid scintillation counters are constructed to handle these small vials and usually cannot handle vials of much larger size because of the construction of the automatic sample changer and/or the construction of the equipment at the vial-receiving chamber, which is usually too small to handle vials of substantially greater diameter. The size of the vial is, therefore, critical for most liquid scintillation spectrometers.

In liquid scintillation detection, a small amount of a fluor substance (the primary solute), such as naphthalene, anthracene or other fluor, is typically dissolved in a larger quantity of an organic solvent, such as phenyl cyclohexane, toluene, xylene or other alkyl benzene to form the liquid scintillation solution or "cocktail." The radioisotope sample to be assayed is either dissolved in or suspended in this solution in the glass counting vial. In many cases the solution includes a secondary solute or fluor which may act as a wavelength shifter.

Figure 5:
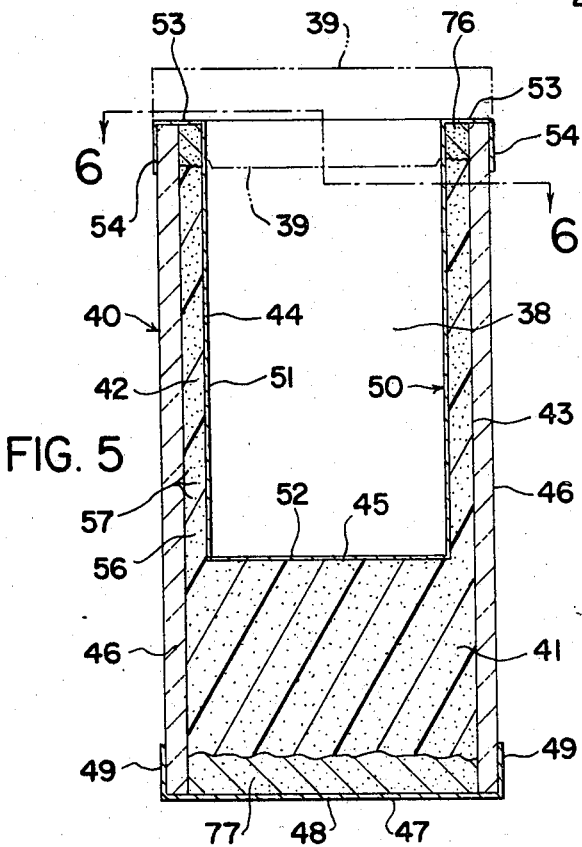
FIG. 5 is an enlarged vertical sectional view of a scintillation counting vial made according to the invention.
Figure 6:
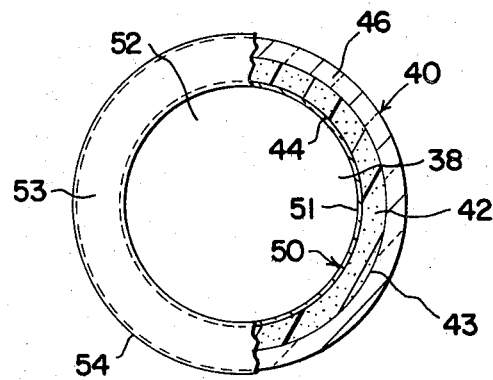
FIG. 6 is a horizontal sectional view taken on the line 6—6 of FIG. 5.
Figure 7:
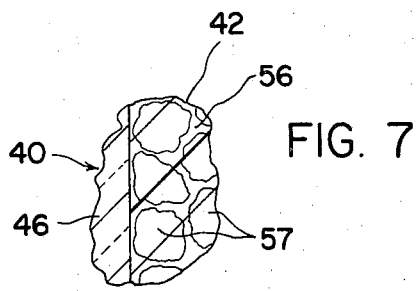
FIG. 7 is a fragmentary sectional view showing the portion of the vial containing the embedded sodium iodide crystals.

FIGS. 5 to 7 illustrate one embodiment of the special small gamma-counting vial of the present invention, the drawing being substantially to scale to facilitate an understanding of the invention. It will be apparent from the description of the invention that the dimensions can vary considerably, but it will be understood that the vial should be of a small size suitable for use in a commercial liquid beta-ray scintillation counter or spectrometer.

As shown, the gamma-counting vial 40 has a main body 41 of circular cross section shaped to provide a vertically elongated cylindrical sample-receiving well or cavity 38 surrounded by a cylindrical peripheral wall portion 42, preferably of uniform thickness. As shown, the body 41 has an external cylindrical surface 43, a concentric internal cylindrical surface 44 and a flat circular surface 45 at the bottom of the well. A transparent outer cylinder or sleeve 46 formed of low-potassium glass, quartz, Vycor or other glass surrounds the body 41 and has a smooth internal cylindrical surface in contact with the outer surface 43 throughout the length and circumference of the main body. If desired, the external surface of cylinder 46 can be sand blasted. A thin bottom end cap or cover 47 formed of aluminum, stainless steel or other suitable metal is mounted on the end of the glass cylinder 46 and has a flat circular portion 48 engaging the bottom of the cylinder and an annular cylindrical flange 49 sealingly engaging the outer cylindrical surface of the cylinder.

A thin cap or cover 50 is mounted on the body 41 and conforms to the well 38. It has a cylindrical sleeve portion 51 engaging the surface 44 throughout the height and circumference of the well, and a flat circular bottom portion 52 engaging the surface 45. The flat annular connecting portion 53 of the cover 50 engages the top end of cylinder 46 and terminates in a cylindrical flange 54 which sealingly engages the outer cylindrical surface of the cylinder 46. The cylinder and the end covers 47 and 50 provide a hermetic seal to prevent moisture from entering the body 41.

It is preferable to provide optical reflecting means at the ends of the unit. As shown in FIG. 5, an annular layer 76 and a flat layer 77 of powdered magnesium oxide, aluminum oxide, titanium dioxide or other suitable photon-reflecting agent are provided at the opposite ends of the main body 41.

If desired, a plug or cap 39 may be placed at the top of the vial to close the well as indicated in dot-dash lines in FIG. 5, but this is not essential. Also, external threads may be provided on the vial as in conventional counting vials if this is desired.

The main body 41 of the vial 40 may be formed by machining a single thallium-activated sodium iodide crystal but because such machining is complicated and expensive if not done in volume production, it is preferably formed of a large number of separate sodium iodide crystal chips. Such crystal chips are preferably covered by an organic scintillator having a cyclic structure favorable to fluorescence as described in more detail hereinafter. The body 41 usually has an external diameter from about 2 to about 3 centimeters and a height from about 3.5 to about 7 centimeters and preferably two to three times the diameter. The peripheral wall portion 42 usually has a radial thickness of about 2 to about 5 millimeters and an axial length preferably at least eight times said radial thickness.

The well 38 of the vial 40 has an internal volume of 2 to 20 cubic centimeters and preferably about 4 to about 15 cubic centimeters and preferably has an internal diameter of from about 1 to about 2 centimeters and a depth of from about 2 to about 5 centimeters.

The transparent cylinder 46 can be formed of a low-potassium glass to reduce cost or can be formed of a high purity quartz glass or Vycor. The inner and outer surfaces of the cylinder 46 can be smooth or polished but this is not essential.

The radial thickness of cylinder 46 is preferably no greater than 3 millimeters and sufficient to exclude moisture and to allow the vial to maintain its shape. Where the wall portion 42 is rigid and has substantial strength, the thickness may be a fraction of a millimeter. Usually the radial thickness of cylinder 46 is about 0.8 millimeter to about 2 millimeters, preferably less than 1.5 millimeters.

The well cover 50 may be spun or otherwise formed from a very thin sheet of a metal, such as aluminum, copper, stainless steel, beryllium or the like which will transmit gamma radiation in the desired manner while excluding water. The thickness of the cover 50 is at least about 0.1 millimeter, usually less than 0.8 millimeter, and preferably no greater than 0.5 millimeter. When the cover is made of Type 1100 aluminum or electrolytic copper, it is light tight and the wall thickness preferably does not exceed 0.6 millimeter. When the cover is made of stainless steel, the wall thickness preferably does not exceed about 0.6 millimeter and more preferably 0.5 millimeter.

Since the photomultiplier (PM) tubes can be located in a dark enclosure, which may be closed off from any source of light by doors (i.e., doors 4) or other suitable means, it is possible to cover the well 38 with a layer (50) which is very thin or which transmits light readily, provided that it is impervious and can provide the needed hermetic seal.

As previously noted, the scintillator 41 in the vial can be cut or machined out of a solid single sodium iodide crystal. Alternatively, it can be made of pressed-together sodium iodide chips, but such do not have good scintillation characteristics.

Preferably, the scintillator 41 is formed by embedding the crystals in a matrix comprising an aromatic polycyclic scintillator having a ring structure favorable to fluorescence in response to gamma radiation. FIG. 7 shows a fragment of the vial 40 wherein a major portion by volume of alkali metal halide crystals 57 are embedded in a solid matrix 56 comprising a minor portion by volume of an organic scintillator which completely covers each crystal 57.

As is well known in the art, the accepted and preferred scintillator compound is thallium-activated sodium iodide crystal chips 57.

Advantages of this invention may be obtained where some or all of the crystals are other metal-activated alkali metal halides, such as lithium fluoride, potassium bromide, sodium chloride, cesium fluoride and the like. Better results are obtained using metal-activated alkali metal iodides, such as iodides of sodium, potassium, rubidium, cesium or lithium. The metal activator for these alkali metal halides may be silver, copper, nickel, antimony, lead or other metal. Tin and thallium are preferred, and the latter is usually used.

The size of the inorganic scintillator crystals used in the vial of the present invention can vary considerably. In general, the crystal pieces used in the main body 41 may be of any size or configuration, for example, from 0.5 millimeter or smaller to several centimeters or more in their longest dimension. The crystal pieces should, of course, be small enough to form the thin peripheral wall portion 42 of the vial. Such crystals could, for example, vary from about 0.2 millimeter to about 2 millimeter or more in the wall portion 42.

The scintillation crystals used in the vial of this invention can be of uneven irregular configuration, or cubic pieces as broken from a larger crystal. Crystal surfaces should be cleansed of all oxides or hydrated compounds. Cleaning can, for example, be carried out by scraping off the exterior degraded surfaces in an inert atmosphere or by washing with anhydrous organic compounds, such as acetone or benzene, or by a combination of both methods. The crystals can be retained in an inert atmosphere prior to immersion in the organic component (i.e., matrix 56) of the detector to prevent contamination. The organic component should sufficiently cover the crystal pieces so they are not subject to atmospheric contaminants, and, therefore, the matrix 56 preferably entirely fills the voids between the crystal pieces 57. Generally it is better to employ a major portion by volume of the inorganic scintillator crystals.

The randomly arranged inorganic crystals 57 may be covered with various organic scintillator matrices having a cyclic molecular structure favorable to fluorescence in response to gamma radiation, particularly aromatic polycyclic scintillators which, under excitation by gramma radiation, emit light with emission bands in the 3,000 to 5,000 Angstrom wavelength range. Scintillators useful as the matrix 56 for the crystal pieces 57 include most known organic scintillator crystals having a plurality of aromatic rings. These include polynuclear aromatic compounds or hydrocarbons consisting essentially of a series of interconnected rings including at least two aromatic rings such as anthracene, naphthacene, pentacene, hexacene, phenanthrene, chrysene, picene, 1,2,5,6-dibenzanthracene, 2,3,6,7-dibenzphenanthrene, pyrene, fluoranthene, fluorene, dibenzo-fluorene, dinaphtho-fluorene, carbazole, naphthophenocarbazole, diphenylene oxide, and the like or mixtures of the aforesaid compounds. The useful scintillators also include naphthalene, phenylnaphthylamine, diphenyl naphthalenes, beta-methyl naphthalene, dimethyl naphthalene, phenyl-α-naphthylamine or the like used alone or in admixture with one or more of the other aforesaid scintillators. The preferred polynuclear aromatic scintillating compounds are condensed polynuclear hydrocarbons or heterocyclic compounds having three to six or more aromatic rings, the term "condensed" indicating that at least two of the rings have carbon atoms in common, as in anthracene, naphthacene, phenanthrene, fluoranthene, fluorene, and carbazole.

Excellent results are also obtained using organic scintillators having benzene rings connected together or separated by aliphatic chains, particularly aliphatic chains with conjugated double bonds. These useful scintillators for the matrix 56 include biphenyl, m-terphenyl, p-terphenyl, p,p'-quaterphenyl, quinquephenyl, sexiphenyl, trans-stilbene, diphenyl ethane, diphenyl butane, 1,4-diphenyl-1,3-butadiene, 1,1',4,4'-tetraphenyl-1,3-butadiene, diphenyl hexatriene, diphenyl acetylene, diphenyl stilbene, and the like and various mixtures of the aforesaid compounds. All of the aforementioned organic compounds must be able to transmit photoluminescence and must be in a relatively pure condition. Other useful scintillators which may be incorporated in the matrix 56 include 1,3,5-triphenyl-2-pyrazoline, 1,3-diphenyl-5-p-methoxyphenyl-2-pyrazoline, other diphenyl pyrazolines disclosed in U.S. Pat. No. 3,244,637, and various oligophenylenes, oxazoles, thiazoles or oxadiazoles with two to six or more benzene rings such as PPO, PBD, PBBO, butyl-PBD, POPOP, dimethyl-POPOP, α-NPO, α-NOPON, and the like and mixtures thereof. Many of these are useful as secondary fluors or may be used as solutes in solid solutions where the solvent is polystyrene, for example.

An abbreviated system has been established in the art for convenience for describing the above compounds where the letter "P" is used for phenyl, "N" for naphthyl, "B" for biphenyl, "O" for oxazole, and "D" for the oxadiazole group.

The organic scintillators mentioned above which are preferred and usually most efficient are those that contain three or more and preferably four to six aromatic or heterocyclic rings linked together in a manner that allows continuous conjugation throughout the molecule. While some of the best organic fluors disclosed herein for use in the present invention as primary and/or secondary solutes are thiazoles, oxadiazoles, thiadiazoles or the like, it will be understood that many other organic fluors are suitable having a heterocyclic nucleus otehr than an oxazole or oxadiazole nucleus as disclosed, for example, on pages 105 and 106 of "Liquid Scintillation Counting" by Carlos G. Bell and F. Newton Hayes, published 1958 by Pergamon Press. The heterocyclic nucleus may be a five-membered or six-membered ring containing up to four and preferably one to two atoms selected from the group consisting of oxygen, nitrogen and sulfur.

Good results may also be obtained where the organic scintillator for matrix 56 is a polymer of an alkenyl benzene or other polyvinyl resin having recurring aromatic groups, such as polymers of vinyl benzene or loweralkyl-substituted alkenyl benzenes, preferably having one to two or more alkyl groups with 1 to 4 carbon atoms and more preferably one or two methyl groups. For example, the matrix may be formed by polymerizing a monomer such as styrene, methylstyrene, ethylstyrene, 2,4-dimethyl styrene, 2,5-dimethyl styrene, 3,4-dimethyl styrene, 4-iodostyrene, monochlorostyrenes, or the like or mixtures thereof. Thus both homopolymers and copolymers suitable for use in the present invention can be synthesized from these monomers. They can, for example, be copolymerized with divinyl benzene, various cross-linking agents, and monomers such as vinyl naphthalene, vinyl carbazole, diphenyl butadiene, diphenyl hexatriene, vinyl furane, ethylene, stilbene, propylene and the like. In making copolymers for use in the matrix 56, it is desirable to minimize the use of monomers not possessing resonance energy, but it will be apparent that substantial amounts of such monomers can usually be included so long as they constitute a minor proportion by weight, it being understood that their amount preferably does not exceed twenty percent of the total polymer by weight. These should, of course, have little or no quenching effect so that the copolymer has effective scintillating properties. In the preparation of the polymers it should be kept in mind that low temperature polymerization and high molecular weight compositions are preferred.

The specific monomers mentioned above as suitable for making a polymeric matrix 56 and also the various organic scintillating compounds disclosed herein may be replaced in whole or in part by similar compounds, isomers, homologues, etc., and may have lower alkyl substituents and other substituents which do not significantly effect scintillation properties or do not affect them adversely, such as alkoxy groups or phenyl groups. This is particularly true as to the mono-substituted derivatives.

The matrix 56 of the vial 40 can also be formed of a polymer such as polystyrene or polyvinyltoluene either with or without a solute fluor and with or without a secondary solute fluor or wavelength shifter. In some cases the solute fluor is desirable, however. For example, the matrix 56 may be a polystyrene made by polymerizing styrene with 16 grams of tetraphenylbutadiene (primary solute) per liter of styrene monomer. Also it may be polyvinyltoluene using, as the primary solute, 36 grams of p-terphenyl per liter of monomer and, as the secondary solute, either (a) 0.9 gram of diphenylstilbene or (b) 0.2 gram of tetraphenylbutadiene per liter of monomer. Good results can also be obtained where the plastic is, for example, a polymer of styrene, methyl styrene or a dimethyl styrene using 0.3 percent by weight of p-terphenyl as the primary solute and 0.05 percent by weight of POPOP as the secondary solute.

Various processes may be employed when forming the matrix 56 and when applying the scintillating polymer to the inorganic scintillating crystals 57 of the vial 40. One way is to mix the inorganic crystals in the molten polymer (for example, molten polystyrene or molten polyvinyltoluene). The better method is to mix the styrene or other monomer with the inorganic crystal and to polymerize by heat or preferably in the presence of a suitable catalyst (such as benzoyl peroxide or the like). Where the monomer contains a minor amount of a primary or secondary solute which is unsaturated, such as stilbene, copolymerization may occur. The polymerization of the matrix 56 can take place in a mold so that the main body 41 is molded to the desired size and shape. The body can also be molded to shape when using molten plastic or molten organic crystals. When polymerizing styrene or vinyl toluene, the process can be controlled so that the particles 57 are dispersed in the desired manner throughout the matrix.

The more desirable organic crystals have a gamma pulse height at least 20 to 40 percent of that of anthracene and preferably higher. Also it is desirable when using a plastic scintillator for the matrix 56, to provide a polymeric matrix material with a gamma pulse height at least 20 to 40 percent of that of anthracene and preferably higher. The plastic scintillator used for matrix 56 should have a gamma pulse height at least 50 percent of that of polystyrene and preferably at least equal to that of polystyrene. Higher pulse heights can be obtained using polyvinyltoluene or polymers of dimethyl styrenes.

In the past it was thought that randomly arranged inorganic scintillation crystal pieces of different sizes and shapes did not provide a satisfactory substitute for a conventional single crystal detector. It has now been found that such randomly arranged scintillation crystals can provide excellent results when embedded in a matrix of organic crystals, styrene polymers or the like as described above and as described in copending application Ser. No. 257,755, which was filed May 30, 1972, by the owner of the present application. The mechanism is not completely understood, but it appears that a transfer of excitation energy takes place between the many inorganic crystal pieces and the organic crystals or the styrene polymer or other photofluorescent cyclic organic compound so that the responses are combined in such manner that the body acts generally like a single crystal detector. A multicrystal detector can be fabricated which is almost as good as a single crystal, and, therefore, it is more practical to form the mini-size vials of the present invention from a multiplicity of sodium iodide crystals rather than as a single crystal.

The vial 40 shown herein is quite different from sodium iodide well counters which have been commonly used for measuring gamma radiation. This will become apparent from FIGS. 8 and 9.

Figure 8:
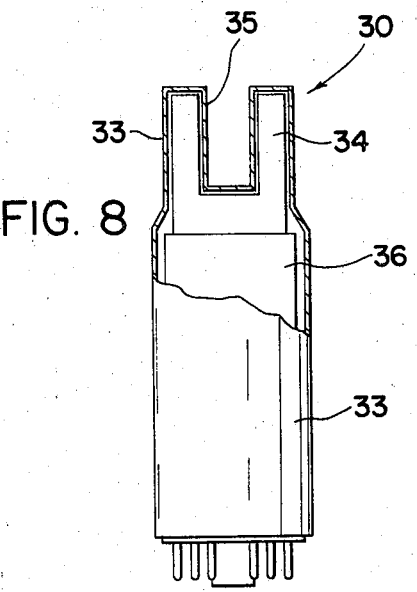
FIG. 8 is a schematic side elevational view of a conventional sodium iodide well counter with parts broken away and shown in section.

FIG. 8 is a schematic representation of a typical prior art gamma radiation well counter 30 having a large sodium iodide crystal 34 optically coupled to a multiplier phototube 36 and hermetically encapsulated in a low mass light-tight aluminum housing 33. The container extends entirely over the base of the phototube 36, thus making the complete detector a simple plug-in unit, and also covers and conforms substantially to the shape of the crystal 34. As shown, the housing has a very thin cylindrical well portion 35 forming an inside well for receiving the sample to be assayed.

Figure 9:
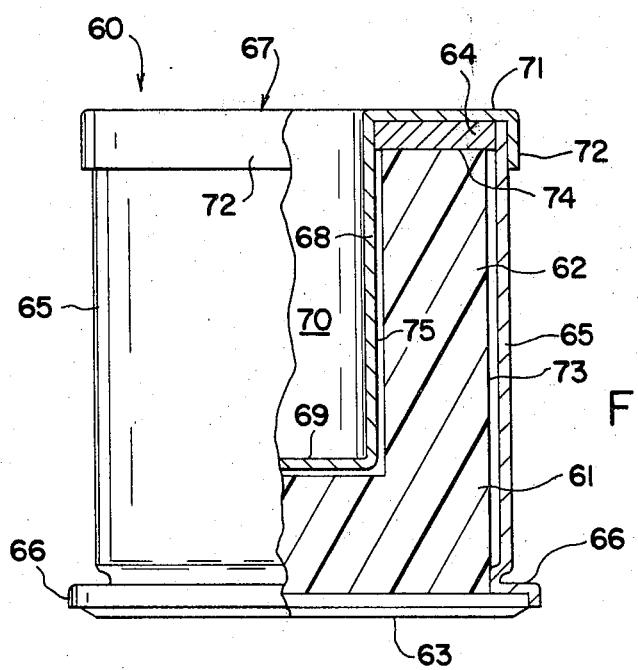
FIG. 9 is a vertical sectional view showing another type of sodium iodide well counter.

FIG. 9 shows a prior art well-type crystal assembly 60 having a large machined sodium iodide crystal 61 with a central sample-receiving cavity 70 surrounded by the cylindrical portion 61 of the crystal. A circular glass optical window 63 is mounted at one end of the crystal, and an annular member 64 is mounted at the opposite end around cavity 70. A spun body 65 surrounds the crystal 61 and has a flange 66 fitting the margin of the window. A spun metal cap 67 conforms to and covers the upper end of the single crystal 61 and has a cylindrical sleeve portion 68 and a flat circular bottom portion 69. The top portion 71 of the cap fits the member 64 and terminates in a downwardly turned annular flange 72 that fits on the body 65. A reflector 73 is provided at the outer cylindrical surface of the crystal 61, and a reflector 74 is provided at the flat surface of the crystal adjacent member 64. A reflector 75 is also provided at the outer cylindrical surface of portion 68. The reflectors 73, 74 and 75 are formed of aluminum foil, aluminum oxide or a layer of other suitable reflective material.

The mini-size vials of the present invention may be fabricated at low cost by various methods as will become apparent to those skilled in the art from the drawings. For example, one simple technique is to seal the quartz cylinder 46 to the well liner 50, thereafter to fill the resulting cavity with screened sodium iodide chips, and then to pour molten high-purity naphthalene at 100°C. over the chips to fill the cavity. The unit may be heated in an oven to 90° to 100°C. before the molten naphthalene is added. Finally, the aluminum cap 47 is placed on the end of filled unit and flanges 49 thereof sealed with a suitable adhesive composition such as an epoxy resin composition. The same type of seal may also be provided at the flanges 54 of the well liner 50.

As used herein, the term "polymer" includes both homopolymer and copolymer and the term "copolymerm" includes terpolymers unless the context indicates otherwise.

The term "scintillation crystal" refers to a crystal which has an observable scintillation response and which produces flashes of light upon excitation by ionizing radiation. Usually such a crystal is formed of a single material, such as sodium iodide, cesium iodide, anthracene, napthacene, stilbene or the like, but mixed crystals can be grown that might be useful in the practice of this invention.

It will be understood that mixtures of different types of inorganic crystals could also be used in the body 41 but there is no known advantage for such mixtures. Best results are obtained when all of the crystals are either sodium iodide or cesium iodide. While other inorganic crystals could be used, it is undesirable to use any crystal with a gamma pulse height less than 50 percent of that of a conventional thallium-activated sodium iodide scintillation crystal.

The terms "plastic scintillator" and "scintillation polymer" as used in the specification and/or claims refer to polymers having aromatic groups providing a scintillation response in response to gamma radiation adequate for measurement on conventional gamma-ray spectrometers.

FIGS. 5 and 6 show a preferred form of mini-size vial constructed according to this invention, but it will be understood that the construction may be changed in various ways. For example, the photon-reflecting agent at 76 and 77 can be omitted so that the body 41 contacts the wall portions 48 and 53. The cap 47 could be formed of many different materials and could have a reflector on its inner surface.

By virtue of the substitution of a special gamma-measuring vial, the process of this invention makes it possible for the first time to provide efficient measurement of both gamma and beta radiation with the same spectrometer and makes it feasible to provide economical computerized equipment for handling both of these jobs. A laboratory can be equipped with one liquid scintillation beta-ray counter or spectrometer, such as the spectrometer A, together with an ample supply of standard glass vials. The latter can be purchased in cases of 500 to 1,000 as needed, and it is contemplated that the laboratory would also purchase an ample supply of the special gamma-ray counting vials of this invention (see FIGS. 5 and 6) in substantially the same size so that they would fit the automatic sample changer (i.e., changer 10 of FIG. 2). When it was desired to use the beta-ray spectrometer in the assaying of liquid or solid samples containing gamma emitters, such samples would be placed in the special vials of the present invention (i.e., vial 40) and such vials would be fed to the spectrometer by the automatic sample changer (i.e., changer 10) to measure gamma radiation.

While the invention is particularly well suited to laboratories already equipped with a liquid scintillation spectrometer, it is also highly advantageous for new spectrometers, and it will be understood that the computerized equipment for recording or analyzing the data from the spectrometer may be designed to facilitate efficient study of both gamma and beta radiation.

It will be understood that, in accordance with the patent laws, these and other variations and modifications of the specific devices and processes disclosed herein may be made without departing from the spirit of the invention.

Having described our invention, we claim:

1. In a liquid scintillation process for assaying samples emitting beta radiation wherein a series of glass vials, which contain a scintillation solution are fed in sequence from a sample changer to a small vial-receiving chamber located adjacent the photomultiplier tubes of a beta-ray spectrometer, whereby each vial is optically coupled to said photomultiplier tubes for measurement of beta radiation, the steps which comprise placing a large number of different samples of material which emit gamma rays in a multiplicity of special counting vials of a size to fit in said vial-receiving chamber, feeding said special vials to said chamber of said spectrometer from said sample changer, and measuring and recording the gamma radiation from said samples as indicated by said spectrometer, each of said special vials having a peripheral wall formed of scintillation means including inorganic crystals having an effective response to gamma radiation.

2. In a liquid scintillation process wherein a series of samples are assayed in a beta-ray spectrometer having a small vial-receiving chamber located adjacent a photomultiplier tube and having a sample changer for feeding diminutive glass vials to said chamber in a predetermined sequence, the steps which comprise supporting on said sample changer a large number of special diminutive vials of a size to fit in said chamber, feeding said special vials from said sample changer to said chamber in a predetermined sequence, and measuring on said beta-ray spectrometer the gamma radiation from different samples in said special vials, each of said special vials having an axially elongated main body portion with an upper central sample-receiving recess and a peripheral wall surrounding said recess, said body portion being formed of scintillation means responsive to gamma radiation and formed of inorganic scintillation crystals.

3. The process of claim 2 in which the body portion comprises inorganic scintillation crystals covered by an organic scintillator having a molecular structure favorable to fluorescence.

4. The process of claim 3 in which said organic scintillation comprises a light-transmitting polymer having recurring resonant aromatic groups.

5. The process of claim 3 in which said organic scintillator comprises a fluorescent polynuclear aromatic hydrocarbon.

6. The process of claim 2 in which said main body portion contains a large number of pieces of the inorganic scintillation crystals embedded in and distributed through a matrix comprising a fluorescent polynuclear aromatic compound having at least two benzene rings.

7. In a liquid scintillation beta-ray spectrometer having a small vial-receiving chamber located adjacent photomultiplier tubes of an electronic counting circuit and having a sample changer with means for feeding hundreds of diminutive glass beta-counting vials one at a time to said chamber in a predetermined sequence, a large number of special diminutive gamma-counting vials, each having an axially elongated main body with an upper sample-receiving recess surrounded by a peripheral wall formed of inorganic scintillating crystals having an effective response to gamma radiation.

8. The apparatus of claim 7 in which said main body of each special vial is formed of a large number of pieces of said crystals and is surrounded by a thin casing having a transparent glass portion to permit optical coupling of the fluorescing crystals and the photomultiplier tubes when the vial is located in said chamber.

9. The apparatus of claim 7 in which the main body of each gamma-counting vial is formed of a metal-activated alkali metal iodide and said main body has a thin metal layer at the inner surface of said sample-receiving recess and a glass layer at the outer peripheral surface of said body.

10. The apparatus of claim 7 in which said main body is surrounded by a thin transparent elongated sleeve of low-potassium glass having a diameter from about 2 to about 3 centimeters.

11. The apparatus of claim 7 in which each special vial comprises an externally cylindrical axially elongated main body having an upper cylindrical recess with a volume of at least about 4 cubic centimeters and a cylindrical peripheral wall portion surrounding said recess, a low-potassium glass sleeve of a size to fit the external surface of said main body extending the full length of said body, a bottom wall closing and sealing the bottom end of said vial, and a cover layer shaped to conform to said recess and having a thickness less than 1 millimeter, said cover layer covering the upper end of said peripheral wall and closing and sealing the upper end of said vial to exclude moisture from said main body.

12. The apparatus of claim 11 in which said sleeve is formed of quartz glass; said main body is molded of a large number of pieces of thallium-activated alkali-metal iodide scintillation crystals covered by an aromatic polycyclic organic scintillator having a molecular ring structure favorable to fluorescence from gamma radiation and a gamma pulse height at least 20 percent of that of anthracene; and a photon-reflecting agent is sealed within the vial at opposite ends of said main body.

13. In a liquid beta-ray scintillation spectrometer having a small vial-receiving chamber of a size to receive mini-size counting vials, closely spaced opposed photomultiplier tubes at opposite sides of said chamber and contiguous thereto, an automatic sample changer for feeding vials one at a time to said chamber, said sample changer containing a large number of gamma-ray counting vials, each of the latter vials having an upper central sample-receiving recess with a volume of at least 4 cubic centimeters surrounded by a circumferential wall of narrow cross section formed of scintillation means having an effective response to gamma radiation, said scintillation means comprising alkali metal halide crystals containing a metal impurity as an activator.

14. In a liquid soft-beta scintillation spectrometer having a vial-receiving chamber of a size to receive vials with an external diameter of from about 2 to about 3 centimeters, closely spaced opposed photomultiplier tubes at opposite sides of said chamber, and an automatic sample changer for feeding vials one at a time to said chamber, a vertically elongated vial of a size to fit in said chamber, said vial having an upper central sample-receiving recess with a volume of from about 4 to about 15 cubic centimeters surrounded by a clear circumferential wall of narrow cross section having an axial length at least eight times its radial thickness, said circumferential wall being formed of scintillation means responsive to gamma radiation, said scintillation means comprising alkali metal halide crystals containing an activator metal, said crystals being completely covered to exclude moisture.

15. A vial for measuring gamma radiation in a liquid scintillation spectrometer, said vial having a vertically elongated peripheral wall of narrow radial cross section having an external diameter from about 2 to about 3 centimeters and being formed of inorganic scintillation crystals.

16. A gamma-ray vial according to claim 15 having an internal cavity with a volume of from about 4 to about 15 cubic centimeters.

17. A gamma-ray vial according to claim 16 in which said peripheral wall is substantially transparent, is formed of alkali metal halide crystals containing an activator metal, and has a radial thickness of from about 2 to about 5 millimeters.

18. A gamma-ray vial according to claim 17 in which alkali metal iodide particles are embedded in and distributed through a matrix comprising an organic scintillator having a molecular structure favorable to fluorescence including a plurality of benzene rings.

19. A vial according to claim 18 in which said matrix comprises a solid polyvinyl resin having recurring resonant aromatic groups.

20. A vial according to claim 19 in which said polyvinyl resin contains a solute fluor comprising an organic scintillator having a plurality of benzene groups.

21. A vial according to claim 18 in which said matrix comprises a solid polynuclear aromatic scintillator.

22. A gamma-ray vial according to claim 16 in which said inorganic scintillation crystals are surrounded by an axially elongated annular transparent glass sleeve having a radial thickness from about 0.8 millimeter to about 2 millimeters.

23. A vial according to claim 22 in which the inner surface of said peripheral wall and the bottom of said internal cavity are covered by a water-impervious layer having a thickness less than 1 millimeter which allows gamma radiation to pass from the sample to said crystals.

24. A vial for measuring gamma radiation comprising a generally cylindrical outer glass wall with a diameter of from about 2 to about 3 centimeters and a radial thickness no greater than about 2 millimeters, a main body within said glass wall having formed therein an upper sample-receiving chamber with a volume of from about 4 to about 15 cubic centimeters, said body being formed of scintillation means comprising inorganic crystals having an effective response to gamma radiation, and means for closing the bottom end of said vial.

25. A gamma-ray vial according to claim 24 in which said scintillation means comprises a large number of pieces of an alkali-metal iodide activated with thallium.

26. A gamma-ray vial according to claim 25 in which the inner surface of said sample-receiving chamber is covered with a water-impervious sheet having a thickness less than 1 millimeter.

27. A vial according to claim 24 in which said body is completely covered to prevent entrance of moisture.

28. A gamma-ray vial according to claim 24 in which said body is formed of a large number of pieces of thallium-activated sodium iodide crystals embedded in a matrix comprising an organic scintillator having a cyclic molecular structure favorable to fluorescence and a gamma pulse height at least 20 percent of that of anthracene.

* * * * *